United States Patent
Haydock et al.

(10) Patent No.: US 7,205,698 B2
(45) Date of Patent: Apr. 17, 2007

(54) METHOD OF FIXING UNMAGNETIZED MAGNETIZABLE MEMBERS TO A ROTOR DISC AND A ROTOR DISC

(75) Inventors: Lawrence Haydock, Peterborough (GB); Nazar Al-Khayat, Rutland (GB); Neil Brown, Holbeach (GB); Jeremy Owen Dowdall, Rutland (GB); John Ernest Clive Bean, Borne (GB); Stephen Frederick Allen, Stamford (GB); Cleveland Mills, Bourne (GB)

(73) Assignee: Newage International Limited, Lincolnshire (GB)

( * ) Notice: Subject to any disclaimer, the term of this patent is extended or adjusted under 35 U.S.C. 154(b) by 0 days.

(21) Appl. No.: 10/250,961

(22) PCT Filed: Jan. 10, 2002

(86) PCT No.: PCT/GB02/00092

§ 371 (c)(1),
(2), (4) Date: Sep. 2, 2003

(87) PCT Pub. No.: WO02/056443

PCT Pub. Date: Jul. 18, 2002

(65) Prior Publication Data

US 2004/0113505 A1    Jun. 17, 2004

(30) Foreign Application Priority Data

Jan. 10, 2001    (GB)    ................. 0100635.2

(51) Int. Cl.
*H02K 1/22* (2006.01)
(52) U.S. Cl. .................... 310/261; 310/268
(58) Field of Classification Search ............ 310/261, 310/266, 268, 156.12, 156.32, 156.33, 262, 310/267
See application file for complete search history.

(56) References Cited

U.S. PATENT DOCUMENTS

| 4,167,692 A | * | 9/1979 | Sekiya et al. ............... 318/138 |
| 4,835,850 A |   | 6/1989 | Eckold et al. ........... 29/243.52 |
| 5,334,898 A | * | 8/1994 | Skybyk ...................... 310/268 |
| 6,037,696 A |   | 3/2000 | Sromin et al. .............. 310/268 |

FOREIGN PATENT DOCUMENTS

| EP | 0 734 112 A1 | 9/1996 |
| JP | 60043051 A | 3/1985 |
| WO | WO 98/47215 | 10/1998 |

* cited by examiner

*Primary Examiner*—Darren Schuberg
*Assistant Examiner*—Nguyen Hanh
(74) *Attorney, Agent, or Firm*—Hamre, Schumann, Mueller & Larson, PC

(57) ABSTRACT

A rotor disc assembly 10 for an AC machine includes a rotor disc 20, permanent magnets 30 and a spider 40. The rotor disc 10 has a circumferential lip 22 projecting from a surface thereof. The permanent magnets 30 are positioned in a circular array on the surface of the rotor disc 20, with constant angular pitch, and so as to lie against the lip 22. The spider includes an annular base portion 41, with a plurality of arms 42 projecting radially outwards therefrom. The spider 40 is fixed to the surface of the rotor disc 20 such that each arm 42 is between and abuts a respective juxtaposed pair of the permanent magnets 30. The arms 42 and the members 30 are each provided with cooperating wedge-shaped cross sections such that each arm 42 constrains the respective two permanent magnets 30 both axially and tangentially on the surface of the rotor disc 20.

10 Claims, 2 Drawing Sheets

METHOD OF FIXING UNMAGNETIZED MAGNETIZABLE MEMBERS TO A ROTOR DISC AND A ROTOR DISC

BACKGROUND

This invention is concerned with locating and constraining magnetisable members on components of electrical machines. More particularly it is concerned with locating and constraining such members on the rotors of such machines.

The use of rare-earth permanent magnets to provide the excitation field in alternating current (AC) machines is known. However, the handling and mounting of members of rare-earth material is not straightforward. Such members are brittle and are therefore easily damaged. Consequently, it is difficult to mount the members onto a rotor or a stator of an AC machine in such a way that they can withstand the large forces exerted on them during operation, without sustaining damage.

U.S. Pat. No. 6,037,696 discloses a rotor for use in an electrical machine wherein magnetised members are mounted on a surface of a disc-shaped central sheet. The rotor disc of U.S. Pat. No. 6,037,696 includes a braced hub in the form of a spider that is for restraining the central sheet and promoting rotor rigidity. The magnetised members are constrained axially and tangentially on the central sheet by being bonded face-to-face with the surface thereof. The magnetised members are constrained radially on the central sheet by the provision of a circumferential lip that is formed integrally with the central sheet. Further radial constraint is provided by bonding a radially innermost edge of each magnetised member to the braced hub.

SUMMARY OF THE INVENTION

It is an object of this invention to provide an improved method of fixing unmagnetised magnetisable members to a rotor disc, and to provide an improved rotor disc.

According to an aspect of this invention there is provided a method of fixing unmagnetised magnetisable members to a rotor disc for an alternating current machine, comprising the steps of:
a) substantially arranging the magnetisable members in a circular array on a surface of the disc and such that each magnetisable member abuts peripheral structure of the disc; and
b) fixing fixing means to the rotor disc, the fixing means being arranged such that, when so fixed, it abuts each of the magnetisable members and thereby constrains each magnetisable member tangentially and axially during operation of the machine.

Thus, it follows that the fixing means provides positive mechanical fixing of the magnetisable members axially and tangentially to the rotor disc.

Step (b) may be preceded by the step of presenting the fixing means to the surface of the disc, the fixing means preferably being a unitary member arranged to abut each magnetisable member simultaneously in being so presented and thereby to locate each magnetisable member in a respective desired location on the rotor disc.

According to another aspect of this invention there is provided a rotor disc assembly for an alternating current machine, the assembly comprising a rotor disc with peripheral structure projecting from a surface of the disc, a plurality of magnetisable members, and fixing means, wherein the members are positioned on the surface in a circular array and adjacent the peripheral structure such that during operation of the machine the members are radially constrained thereby, and the fixing means is attached to the disc, wherein the fixing means is arranged to abut each of the members so as to constrain them axially and tangentially during operation of the machine.

Preferably, the fixing means and the magnetisable members have mutually abutting surfaces that are substantially oblique to the surface of the disc.

The fixing means may include a spider with a plurality of arms projecting radially from a center of the spider. Preferably the spider is attached to the disc such that each member is separated from a neighbouring member by an arm of the spider, each member being in abutment with two arms. The spider may be plastic, and preferably it is nylon.

Each arm of the spider may include at least one surface that is substantially oblique to the plane of the spider containing the arms, the substantially oblique surface being for abutting a corresponding surface of at least one respective magnetisable member to thereby locate and constrain that member.

Preferably, the arms of the spider have a first substantially trapeziform cross section, a shorter of the two parallel sides of this first trapezium being for placing adjacent the surface of the disc; and the magnetisable members preferably each have a second substantially trapeziform cross section, a longer of the two parallel sides of this second trapezium being for placing adjacent the surface of the disc.

Preferably, the perpendicular distance between the two parallel sides of the first trapezium is less than the perpendicular distance between the two parallel sides of the second trapezium, such that each member projects further from the surface of the disc than does each arm of the spider.

The spider may include location means between each pair of arms such that presenting the spider to the disc locates the magnetisable members adjacent the peripheral structure of the disc. Preferably the location means is a sprung member integral with the spider.

The peripheral structure of the disc may be a continuous circumferential lip. The lip may be integrally formed with the disc.

BRIEF DESCRIPTION OF THE DRAWINGS

A rotor disc assembly in which the invention is embodied for use in an AC machine is now described by way of example only and with reference to the accompanying drawings, of which.

DETAILED DESCRIPTION OF EMBODIMENTS OF THE INVENTION

Figure 1:
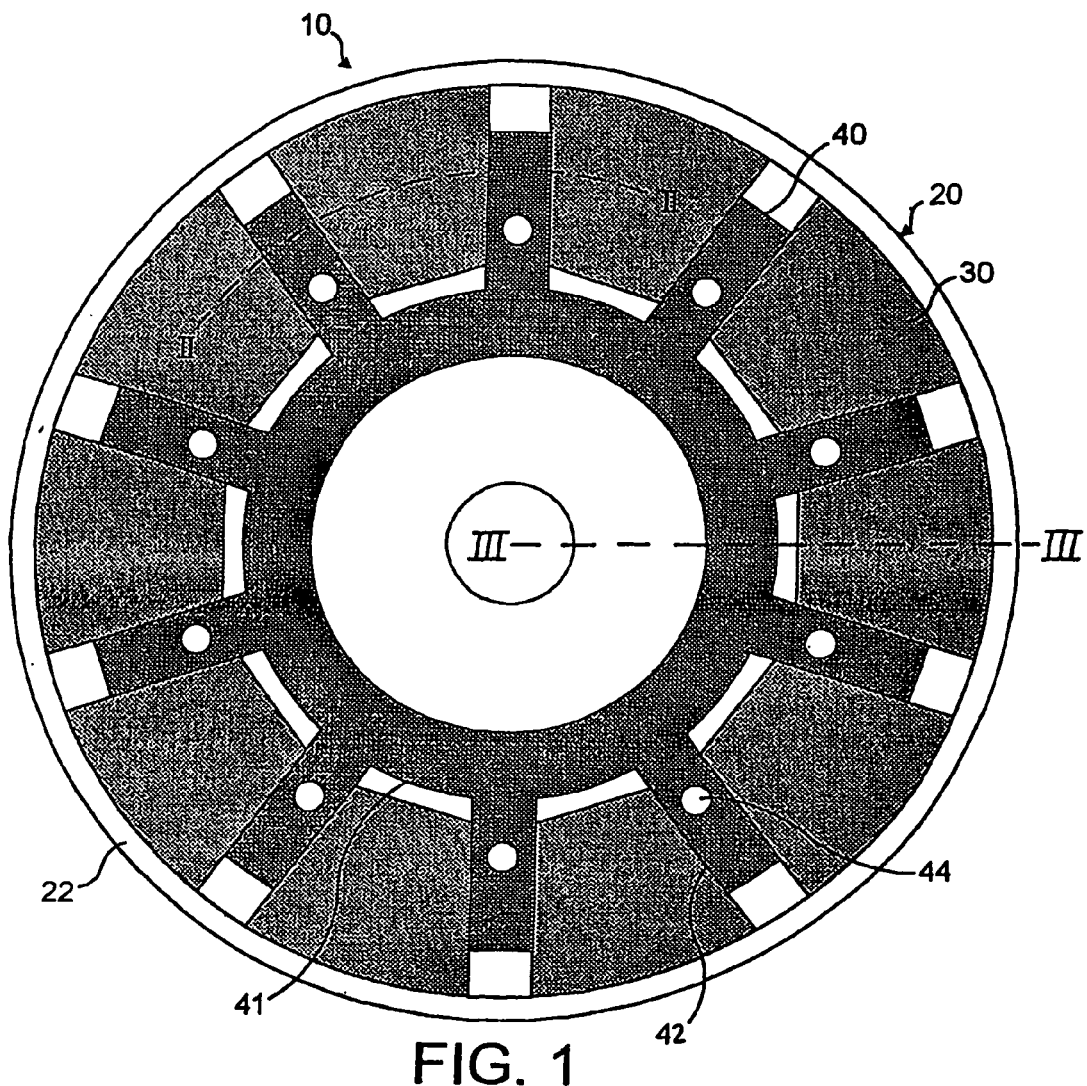
FIG. 1 is a plan view of the rotor disc assembly.

FIG. 1 shows a rotor disc assembly 10. The assembly 10 includes a rotor disc 20, a plurality of members of magnetisable material 30 and a spider 40. The rotor disc 20 is a generally flat circular member that is fabricated from a ferrous material, such as cast iron or steel. The rotor disc 20 includes a circumferentially continuous integral lip 22 that is formed so as to project from the periphery of a surface of the disc 20 in a direction perpendicular to the surface. At its center, the rotor disc 20 is mounted on a rotary member (not shown) in a conventional manner.

The magnetisable members 30 are of a rare-earth material such as Neodymium-Iron-Boron (NeFeB). The preferred number of members is 16. However, it is envisaged that any type of magnetisable member may be suitable and that almost any even number of such members may be used. For the sake of clarity, however, FIG. 1 shows a rotor plate assembly 10 with only ten members 30. The members 30 are thin plates that are first formed so as to have a trapeziform planform, ie a quadrilateral with two parallel sides, the parallel sides being of different lengths and separated from one another by two sides of equal length that are oblique to the parallel sides. The longer of the two parallel sides of each trapezium is further shaped, preferably by wire erosion, into an arc of diameter equal to an inside diameter of the circumferential lip 22. Each member 30 is positioned on the surface of the rotor disc 20 with its arcuate side abutting the circumferential lip 22 and spaced from its two neighbouring members 30 such that, collectively, the members 30 are circumferentially distributed with a substantially constant angular pitch.

The spider 40 is formed from a resiliently deformable material such as nylon. The spider 40 comprises an inner annulus 41 and a plurality of arms 42 that project radially outwards from the annulus 41. The arms 42 are distributed around the circumference of the annulus 41 with a substantially constant angular pitch. The number of arms 42 is equal to the number of members 30 and so in this preferred embodiment there are 16 arms 42. For the reason given above, however, FIG. 1 shows a spider 40 with ten arms 42. Each arm 42 includes a respective hole (not shown) formed in it. The bore of the hole in each arm is coaxial with a respective hole (not shown) that is formed in the rotor disc 20. In this preferred embodiment, a respective rivet 44 is provided through the hole in each arm 42 of the spider 40 and each respective hole in the rotor disc 20 to fix the spider 40 to the surface of the rotor disc 20. However, it is envisaged that many different ways of fixing the spider 40 to the surface of the rotor disc 20 may be used, for example nuts and bolts may be used.

Figure 2:
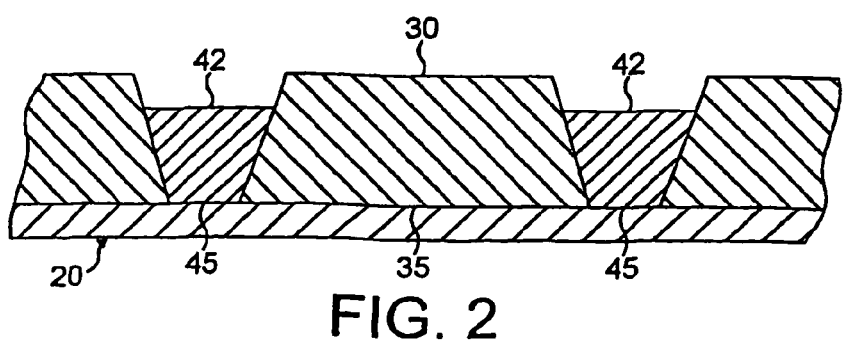
FIG. 2 is a sectional view of a portion of the rotor disc assembly, the section being at line II—II of FIG. 1.

FIG. 2 shows parts of the rotor disc 20, the members 30 and the spider 40 in more detail. Each member 30 is trapeziform in cross-section (i.e. a quadrilateral with two parallel sides), the parallel sides being of different lengths and separated from one another by two sides of equal length that are oblique to the parallel sides. The general shape of the cross-section of each member 30 is, therefore, wedge-like. Each arm 42 is also trapeziform in cross-section, the parallel sides being of different lengths and separated from one another by two sides of equal length that are oblique to the parallel sides. Again, the general shape of the cross-section of each arm 42 is wedge-like. Each member 30 has the longer parallel side 35 adjacent the surface of the rotor disc 20. Each arm 42 has the shorter parallel side 45 adjacent the surface of the rotor disc 20 when the spider 40 is attached thereto. The perpendicular distance between the parallel sides of each member 30 is greater than that for each arm 42 so that each member 30 protrudes further from the surface of the rotor disc 20 than does each arm 42. Each member 30 is sandwiched by a respective pair of arms 42. Both oblique sides of each member 30 are abutted by a respective oblique side of each of the respective pair of arms 42 that sandwich it. The relative dimensions of the trapeziform cross-section of the members 30 to the trapeziform cross-section of the arms 42 are such that there is interference between each member 30 and the respective pair of arms 42 that sandwich it. In other words, the arms 42 of the spider 40 act as wedges between the members 30. Consequently, the members 30 are firmly held in place by the spider 40.

The rotor disc assembly 10 is assembled in three stages. Firstly, the rotor disc 20 is supported such that the plane of the disc 20 is generally horizontal and the aforementioned surface of the disc 20 is facing upwards.

Secondly, the members 30, which are unmagnetised, are placed on the surface of the rotor disc 20. Each member 30 is orientated with the longer parallel side 35 of its trapeziform cross-section adjacent the surface of the rotor disc 20 and positioned with the arcuate side of its planform adjacent the circumferential lip 20. Furthermore, each member 30 is spaced from its two neighbouring members 30 such that, collectively, the members 30 are circumferentially distributed with approximately constant angular pitch and such that each member 30 lies approximately mid-way between two of the holes in the rotor disc 20.

The third step is to mount the spider 40 onto the rotor disc 20. The spider 40 is orientated with the shorter parallel side 45 of its trapeziform cross-section adjacent the surface of the rotor disc 20 and aligned such that the holes in the arms 42 line up with the holes in the rotor disc 20. The spider 40 is then presented to the surface of the disc 20 and the members 30 thereon and attached to the rotor disc 20 by riveting, a respective rivet 44 passing through the hole in each arm of the spider 40 and the respective hole in the rotor disc 20 that lines up with that hole. Due to the respective cross-sections of the arms 42 and of the members 30 that were described previously with reference to FIG. 2, the arms 42 guide the members 30 from their initial approximate position to the desired position on the surface of the rotor disc 10. In the second stage of the assembly procedure, it is therefore only necessary to approximately position the members 30 on the rotor disc 20.

With the members 30 fixed in position as described above, each member 30 is then magnetised by placing magnetising means (not shown) adjacent the members 30 and operating the magnetising means. Suitable magnetising means would be that described in International application No. PCT/GB01/05052.

In operation, the members 30 are held in the desired position on the surface of the rotor plate 20 by the spider 40 and the circumferential lip 22. The oblique sides of the trapeziform cross section of the arms 42 of the spider 40 prevent axial and tangential movement of the members 30 and the circumferential lip 22 prevents radial movement of the members 30 relative to the disc 20.

Figure 3:
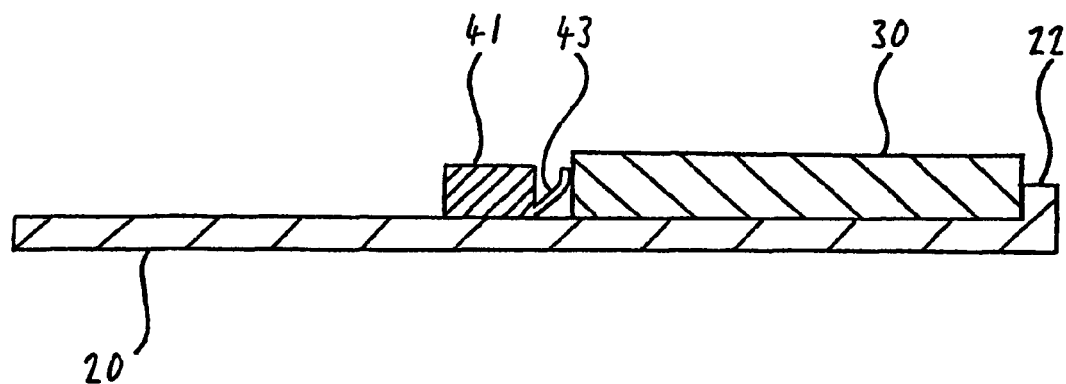
FIG. 3 is a sectional view of another rotor disc assembly similar to that of FIG. 1, the section being along a line of the other rotor disc assembly equivalent to line III—III. of FIG. 1.

Although not a feature of the preferred embodiment, it is nevertheless envisaged that additional structure, for example a spring 43 as shown in FIG. 3, may be provided between each pair of arms 42 of the spider 40. Each spring 43 is a cantilevered flap, a first end of which is integrally joined to the annulus 41 of the spider 40. Each spring 43 is oblique to the plane of the spider 40 such that, in mounting the spider 40 onto the rotor disc 20, each spring 43 urges a respective one of the members 30 against the lip 22. As each spring 43 is integral with the spider 40, it is therefore of the same resiliently deformable material. Thus, it is unnecessary to provide springs 43 of exact dimensions: each spring 43 merely needs to be long enough to exert a force on the respective member 30 such that the member is pushed against the lip 22. Any excess length of the springs 43 will be taken up by deformation of the or each spring 43 that is too long.

The invention claimed is:

1. A rotor disc assembly for an alternating current machine, the assembly comprising:
    a rotor disc with peripheral structure projecting from a surface of the disc;
    a plurality of magnetisable members that are trapeziform in cross-section; and
    a fixing apparatus, comprising a plurality of arms that are trapeziform in cross-section to match with the members:
    wherein the members are positioned on the surface in a circular array and adjacent the peripheral structure such that during operation of the machine the members are radially constrained thereby, and the fixing apparatus is attached to the disc; and further
    wherein the plurality of arms of the fixing apparatus are arranged to abut each of the members so as to constrain them axially and tangentially during operation of the machine.

2. A rotor disc assembly according to claim 1 wherein, the fixing apparatus and the magnetisable members have mutually abutting surfaces that are substantially oblique to the surface of the disc.

3. A rotor disc assembly according to claim 2 wherein the fixing apparatus is a spider with a plurality of arms projecting radially from a center of the spider.

4. A rotor disc assembly according to claim 3 wherein, the spider is attached to the disc such that each member is separated from a neighborring member by an arm of the spider and each member is in abutment with two arms of the spider.

5. A rotor disc assembly according to claim 2 wherein the arms of the spider have a first substantially trapeziform cross section, a shorter of the two parallel sides of this first trapezium being adjacent the surface of the disc; and the members have a second substantially trapeziform cross section, a longer of the two parallel sides of this second trapezium being adjacent the surface of the disc.

6. A rotor disc assembly according to claim 5 wherein the perpendicular distance between the two parallel sides of the first trapezium is less than the perpendicular distance between the two parallel sides of the second trapezium, such that each member projects further form the surface of the disc than does each arm of the spider.

7. A rotor disc assembly according to claim 3 wherein the spider includes a locator between each pair of arms such that attaching the spider to the disc locates the members adjacent the circumferential wall.

8. A rotor disc assembly according to claim 7 wherein the locator is resiliently deformable structure integral with the spider.

9. A rotor disc according to claim 1 wherein the peripheral structure of the disc is a continuous circumferential lip.

10. A rotor disc assembly for an alternating current machine, the assembly comprising:
    a rotor disc with peripheral structure projecting from a surface of the disc;
    a plurality of magnetisable members that are trapeziform in cross-section; and
    fixing means, comprising a plurality of arms that are trapeziform in cross-section to match with the members;
    wherein the members are positioned on the surface in a circular array and adjacent the peripheral structure such that during operation of the machine the members are radially constrained thereby, and the fixing means is attached to the disc, characterized by the fixing means being arranged to abut each of the members so as to constrain them axially and tangentially during operation of the machine.

* * * * *